2,937,921

PRESERVATION OF HIDES

Theone C. Cordon, Philadelphia, Clarence W. Beebe, Roslyn, and Fred P. Luvisi, Philadelphia, Pa., assignors to the United States of America as represented by the Secretary of Agriculture No Drawing. Filed Apr. 17, 1956, Ser. No. 578,848

1 Claim. (Cl. 8—94.15)

(Granted under Title 35, U.S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the preservation of hides in a condition suitable for transportation and storage and such that the hides can be quickly and easily put in condition for tannage when desired.

By the term "hides" we mean to include all animal skins that are commonly tanned, such as for instance, cowhides, horsehides, calfskins, pigskins, sheepskins and goatskins.

Since hides are commonly removed from animals far from tanneries, and since it is usually desirable to store the hides until needed for tanning, there is a great need for a simple and inexpensive process for stabilizing and preserving hides, preferably in the dehydrated form, to facilitate their storage and transportation. Accordingly, it is an object of this invention to provide processes for stabilizing and preserving hides in more or less dehydrated form such that they are easily wet back and can be quickly and uniformly tanned.

According to the invention green hides, either before or after fleshing and dehairing, are soaked in brine of about 10 to 20% concentration and having a pH in the range of about 4 to 6. Hides air-dried after such a treatment have sufficient flexibility to permit compact folding and packaging, yet are quickly and evenly wet back when it is desired to tan them. The dry hides are quite stable, being resistant to microbial deterioration and to attack by vermin and rodents.

While it is old to use salt for the preservation of hides, the usual practice heretofore has been to apply dry salt or saturated brine to the hide. No attention has been directed heretofore to the use of brine of a certain critical concentration or pH.

The pH of the brine is even more critical than is its concentration, the preferred value being about 4.5. The preferred salt concentration in the brine is about 15%. Brine containing less than about 10% of salt yields hides that after drying are hard, stiff and different to wet back while brine containing more than about 20% yields hides that after drying are soft and flexible but difficult to tan unless first leached to remove a portion of the salt. These effects are illustrated by the following typical experiments:

Pieces of hide dehaired by lime were placed in solutions containing 10% NaCl and acidified to give the desired pH. Ph values tested were 3.5, 4.0, 5.0, 6.0 and 7.0. After coming to equilibrium in the buffer solution (18 hours) the pieces were air-dried for 2 days. At pH 7 the hide piece was hard, horny and distorted, and somewhat translucent; at pH 6 the piece was considerably better than at pH 7, but still suffered from the same defects; at pH 5, the piece was in excellent condition, being flat, opaque, moderately flexible and not distorted; at pH 4, the piece was fairly good but showed some of the defects of horniness, distortion, etc. At pH 3.5, the piece was again hard, horny and distorted. The optimum pH value appeared to be between 4 and 5. When the pieces were put into water, the pH 4 and 5 pieces wet back thoroughly and rapidly (2 hours) the pH 6 piece took somewhat longer (6 hours) and the pH 7 piece required 16 hours. The pH 4 and 3.5 pieces swelled unduly in water and it was necessary to add salt to repress swelling. After the soaking, the pieces were put into a vegetable tannin solution. Penetration of tannin was normal in the pH 4 and 5 pieces and slower in the others. Further tests showed that the optimum pH value was about 4.5.

To determine the optimum salt concentration, tests were made using 5%, 10%, 15%, 20%, 25% and saturated NaCl solutions. All hide pieces were brought to a pH of about 4.5 in solutions containing these amounts of salt. The pieces were dried as before. At a salt concentration of 5%, the piece dried out hard and brittle and somewhat distorted; at 10%, the piece was considerably better but still somewhat hard and brittle; at 15% the piece was in very good condition; it was quite flexible and had lost about 40% of its weight and 32% of its volume; if handled slightly before complete drying, it could be folded into a small volume; the folds thus made were not permanent but were removed on soaking. At 20% salt, the piece was about the same as at 15% but was more flexible even after complete drying. However, the loss in weight (35%) and volume (25%) were not as great as at 15%. At higher percentages of salt, the pieces were extremely flexible, but had lost little weight and no volume. When put into water the pieces with 15% or more salt wet back quite readily, the piece with 10% salt with some difficulty and at 5% wetting back was not satisfactory even after several hours. In tanning with vegetable tannin, penetration was satisfactory in the 15 and 20% pieces, somewhat slower at 10%, and quite unsatisfactory at 5% and at 25% and saturated. At 5% this was probably due to unsatisfactory wetting back and at the higher concentrations due to precipitation of tannin by the salt.

Results not significantly different from those obtained in the above experiments were obtained when other kinds of hide, or enzymatically dehaired hide, or hides with the hair still on were similarly treated.

It was observed that the beneficial effects resulting from the process of the invention are accentuated by the addition to the brine bath of a small proportion of a tannin or tanning agent such as alum, sodium polyphosphate, sodium polyacrylate or dialdehydes.

We claim:

A process of stabilizing and preserving hides prior to tanning them comprising soaking green hides in an aqueous solution containing about from 10 to 20% of sodium chloride and having a pH of about from 4 to 6 until equilibrium between the hides and the solution is reached, removing the soaked hides from the solution, and then air-drying them.

References Cited in the file of this patent

UNITED STATES PATENTS

| | | |
|---|---|---|
| 1,395,773 | Rogers | Nov. 1, 1921 |
| 1,557,011 | Blockey | Oct. 13, 1925 |
| 2,516,806 | Schneider | July 25, 1950 |

OTHER REFERENCES

"Progress in Leather Science," 1920–45, Br. Leather Mfgrs. Res. Asso., London, 1948, pp. 130–145.

Pleass: J. of Internat'l. Soc. Leather Trades Chemists, vol. 18, 1934, pp. 464–487.

Strandine: J. of the Am. Leather Chemists Asso., vol. 50, 1950, pp. 287–300.

Thomas: Ind. and Eng. Chem., vol. 17, November 1925, pp. 1162–1164.